United States Patent
Nomizo et al.

(10) Patent No.: US 6,829,664 B2
(45) Date of Patent: Dec. 7, 2004

(54) PROJECTOR CONTROL SYSTEM AND CONTROL METHOD

(75) Inventors: Tomohiro Nomizo, Shiojiri (JP); Shoichi Akaiwa, Matsumoto (JP); Toru Karasawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/323,763

(22) Filed: Dec. 20, 2002

(65) Prior Publication Data

US 2003/0126326 A1 Jul. 3, 2003

(30) Foreign Application Priority Data

Dec. 25, 2001 (JP) .................................. 2001-390882

(51) Int. Cl.⁷ .............................................. G06F 13/12
(52) U.S. Cl. ................................ 710/72; 710/8; 710/9; 710/12; 345/753
(58) Field of Search ...................... 710/8, 9, 12, 72; 345/353, 753

(56) References Cited

U.S. PATENT DOCUMENTS

| | | | | |
|---|---|---|---|---|
| 4,974,073 A | * | 11/1990 | Inova | 348/38 |
| 6,189,050 B1 | * | 2/2001 | Sakarda | 710/18 |
| 6,222,593 B1 | * | 4/2001 | Higurashi et al. | 348/745 |
| 2001/0013843 A1 | * | 8/2001 | Fujiwara et al. | 345/1.2 |
| 2002/0163597 A1 | * | 11/2002 | Kelleher et al. | 348/707 |
| 2003/0098819 A1 | * | 5/2003 | Sukthankar et al. | 345/1.1 |
| 2003/0110217 A1 | * | 6/2003 | Raju | 709/204 |

FOREIGN PATENT DOCUMENTS

CN  1310838 A  8/2001

* cited by examiner

Primary Examiner—Jeffrey Gaffin
Assistant Examiner—Alan S Chen
(74) Attorney, Agent, or Firm—Oliff & Berridge, PLC

(57) ABSTRACT

A controller and a plurality of projectors are connected in a mutually communication enabled state by a network, etc., and thus projection information and control information are sent from the control unit to each of the projectors simultaneously or individually. Also, the control unit obtains operation information, etc. of each of the projectors, and monitors the projectors.

25 Claims, 12 Drawing Sheets

PROJECTOR CONTROL SYSTEM AND CONTROL METHOD

BACKGROUND OF THE INVENTION

1. Field of the Invention

The present invention relates to a projector control system and a projector control method, for example, to a projector control system and a projector control method in which control information and/or projection information are sent to one or more projectors connected through a communication line, and operation information is received from the projector in order to centrally manage and control each of the projectors.

2. Description of the Related Art

FIG. 12 is a configuration diagram illustrating an example of the conventional projector system connected to a network. In FIG. 12, a projector 20, a notebook-sized personal computer 30, a server 40, desktop personal computers 51, 52, 53, and 54 are individually connected to a network 10. Furthermore, tablets 61, 62, 63, and 64 are directly connected to the projector 20.

Control information and projection data from the notebook-sized personal computer 30 are sent to the projector 20 through the network 10, and a predetermined data is projected onto the projection screen 70. Also, the notebook-sized personal computer 30 sends the control information to the server 40 or desktop personal computers 51, 52, 53, and 54 through the network 10. Projection information stored in the server 40 or desktop personal computers 51, 52, 53, and 54 is sent to the projector 20 based on the control information.

Accordingly, for example, by just bringing the projector 20 and the notebook-sized personal computer 30 in a conference room, projection data stored in the desktop personal computers 51, 52, 53, and 54, or the server 40, which are located in another place, can be freely projected.

Further, from the tablets 61, 62, 63, and 64, information can be directly entered into the projector 20, and information can be added and changed onto the projected information.

Furthermore, if the projection data has been sent to the projector 20 in advance, the projection data can be projected in a disconnected state to the network 10 or independent of the notebook-sized personal computer 30.

Although the conventional projector system is configured as described above, and it is possible to project projection data stored in a personal computer or a server located in another place. Thus the projector system contributes to information sharing and increasing projection efficiency.

The conventional projector system described above has the above-described effects, there have been the following demands:

(1) A demand for simultaneous projection onto more than one projector in a conference room with many people or a large exhibition hall.

(2) Also, in school, a demand for projecting specific projection data onto more than one projector installed at each classroom, etc. simultaneously for all classes in the school, or a demand for projecting specific projection data for classes of an individual grade.

(3) Also, a demand for constituting a huge projection screen using more than one projector by dividing projection data to be projected on the huge screen, and allocating a projector to each of the divided data individually.

(4) Furthermore, a demand for managing and controlling one or more projectors centrally.

SUMMARY OF THE INVENTION

The present invention is made in order to meet these demands, and it is an object of the present invention to provide a projector control system and a projector control method in which desired projection data can be projected as desired for one or more projectors without connecting a personal computer, etc. to each of the projectors, and furthermore, one or more projectors can be managed/controlled centrally.

In view of the above-described problems, the present invention has the following configuration.

According to a first aspect of the present invention, there is provided a projector control system including: one or more projectors; a control unit for controlling the projector; and a communication line for connecting the projector and the control unit by two-way communications. By this means, projection information is distributed and displayed onto a plurality of projectors simultaneously, and operation state of each projector is grasped. Thus it becomes possible for the control unit to manage and control each projector simultaneously.

In a projector control system according to the first aspect of the present invention, the control unit may includes: a control information sending/receiving part which sends/receives control information to/from the projector; a projector management part which registers and manages a projector connected to the communication line; and a monitoring/control supervising part which sends control information to the projector through the control information sending/receiving part, receives operation information of the projector through the control information sending/receiving part, and monitors/controls the projector.

In a projector control system according to the first aspect of the present invention, the control unit may include: a projection information storage part for holding projection information; and a projection information sending part for sending projection information to the projector.

In a projector control system according to the first aspect of the present invention, the projector may include: a control information sending/receiving part which sends/receives control information to/from the control unit; and a projection control part which controls the projector based on the control information from the control unit.

In a projector control system according to the first aspect of the present invention, the projector may include: a control information sending/receiving part which sends/receives control information to/from the control unit; a projection information receiving part which receives projection information from the control unit; and a projection control part which is controlled based on the control information from the control unit, and analyzes and projects projection information from the control unit.

In a projector control system according to the first aspect of the present invention, it is preferable to further include synchronous control means by which the control unit and each of the projectors are synchronized with respect to projection. By this means, in a projection performed by a plurality of projectors, a screen in the same state can be viewed simultaneously on any one of the projectors.

In a projector control system according to the first aspect of the present invention, the control unit may include a group management part which registers and manages the projectors in groups. By this means, it becomes easy to manage and control the projectors in groups.

In a projector control system according to the first aspect of the present invention, the control unit and each projector may be connected to a network. By this means, communication between each of the projectors becomes possible in addition to the communication between the control unit and each of the projectors.

In a projector control system according to the first aspect of the present invention, the control unit and each projector may be connected via a USB connection. By this means, the control unit and each projector can be connected easily without setting network configuration or the like.

In a projector control system according to the first aspect of the present invention, the control unit may include an information input part which inputs information into the control unit. By this means, various control information and projection information can be entered from the outside of the system.

In a projector control system according to the first aspect of the present invention, the control unit may include projector detection means which detects a projector connected to the communication line. By this means, a projector which has been newly connected to the communication line can be automatically detected.

According to a second aspect of the present invention, there is provided a method of controlling a projector, in which a system comprising a control unit connected to one or more projectors through a communication line is used, the method including: a step for making a state capable of communication between the control unit and the projector; a step for sending control information of the projector from the control unit to the projector; and a step for disconnecting the state capable of communication between the control unit and the projector. By this means, each of the projectors can be controlled centrally.

In a method of controlling a projector according to the second aspect of the present invention, it is preferable to further include a step for obtaining operation information of the projector, which the control unit is in the state capable of communication with, from the projector by the control unit. By this means, each of the projectors can be monitored centrally.

In a method of controlling a projector according to the second aspect of the present invention, the control unit may send control information and/or projection information to all the projectors simultaneously. By this means, it becomes possible to simultaneously control a plurality of projectors and/or simultaneously project an image on a plurality of projectors.

In a method of controlling a projector according to the second aspect of the present invention, the control unit may send control information and/or projection information to a specific projector among the projectors. By this means, it becomes possible to individually control a projector or individually project an image on a projector.

In a method of controlling a projector according to the second aspect of the present invention, it is preferable to further include a synchronous control step for synchronizing projections between the control unit and each of the projectors when projecting on more than one projector simultaneously. By this means, it become possible to project the same content simultaneously on a plurality of projectors currently operating, and to combine a plurality of projectors currently operating to project one image.

In a method of controlling a projector according to the second aspect of the present invention, the synchronous control step may include: a step for sending control information from the control unit to the projector; a step for returning a processing status for the control information from the projector, which has received the control information to the control unit: and a step for adjusting projection timing of the projector by the control unit based on the processing status of the projector. By this means, time deviation of projection among each of the projectors can be corrected.

In a method of controlling a projector according to the second aspect of the present invention, the synchronous control step may include: a step for sending control information from the control unit to the projector; a step for returning a processing status for the control information by the projector which has received the control information to the control unit; and a step for excluding the projector which has not completed the processing for the control information in a predetermined time period, from the object of projector to perform the simultaneous projection, by the control unit. By this means, a projector which has a relatively large projection time deviation among each of the projectors is excluded from the object of simultaneous projection.

In a method of controlling a projector according to the second aspect of the present invention, it is preferable to further include a step for specifying a specific projector as a host projector out of the projectors by the control unit; and a step for sending control information and projection information to the other projector by the specified host projector. By this means, a host projector can partly take charge of the control unit, and thus the load of the control unit can be reduced.

In a method of controlling a projector according to the second aspect of the present invention, synchronous control processing may be performed between the host projector and the other projectors.

In a method of controlling a projector according to the second aspect of the present invention, the method may further include a step for registering a projector which is connected to the control unit via a network into the control unit, by entering a projector name and an IP address of each projector from outside of the system.

In a method of controlling a projector according to the second aspect of the present invention, the method may further include a step for registering a projector which is connected to the control unit through a communication line into the control unit, by automatically detecting each projector.

Furthermore, in a method of controlling a projector according to the second aspect of the present invention, the method may include a step for registering a projector which is connected to the control unit through a network, by a projector name.

In a method of controlling a projector according to the second aspect of the present invention, the method may further include a step for sending control information by broadcast from the control unit to the projectors, a step for returning a projector name and an IP address from each projector to the control unit so that the control unit obtains them, and a step for comparing a registered projector name with the obtained set of the projection name and the IP address to identify the projector. By this means, even if an IP address is changed, it becomes possible to identify a projector.

In a method of controlling a projector according to the second aspect of the present invention, registration of a projector into the control unit may be performed using a projector name, a connection method between the control unit and the projector, and a projector identification code.

DESCRIPTION OF THE PREFERRED EMBODIMENTS

[Connection Mode Between Control Unit and Projector]

Figure 1:
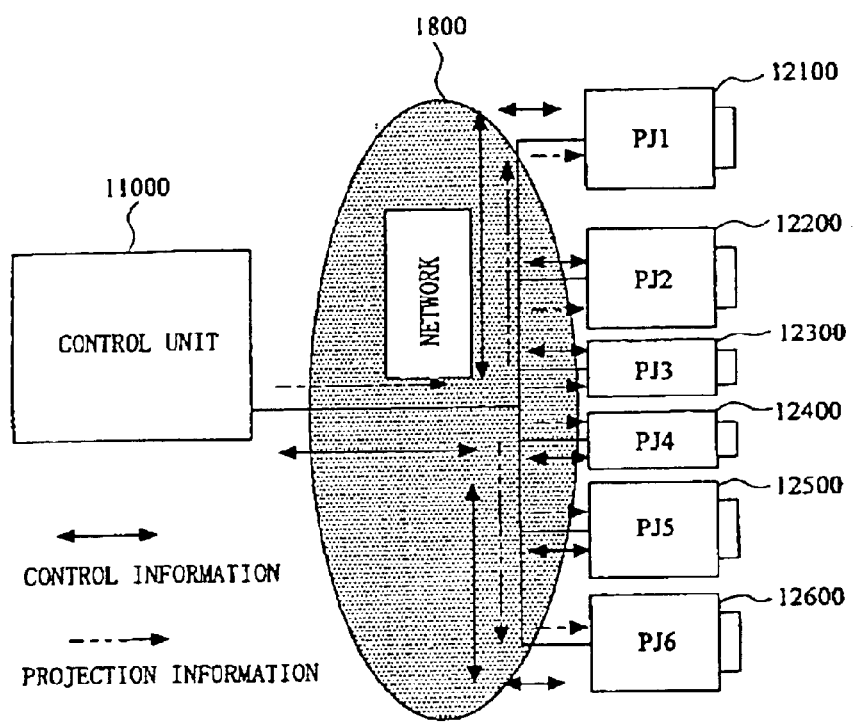
FIG. 1 is a block diagram illustrating a connection configuration (network connection) of a projector control system according to an embodiment of the present invention.
Figure 2:
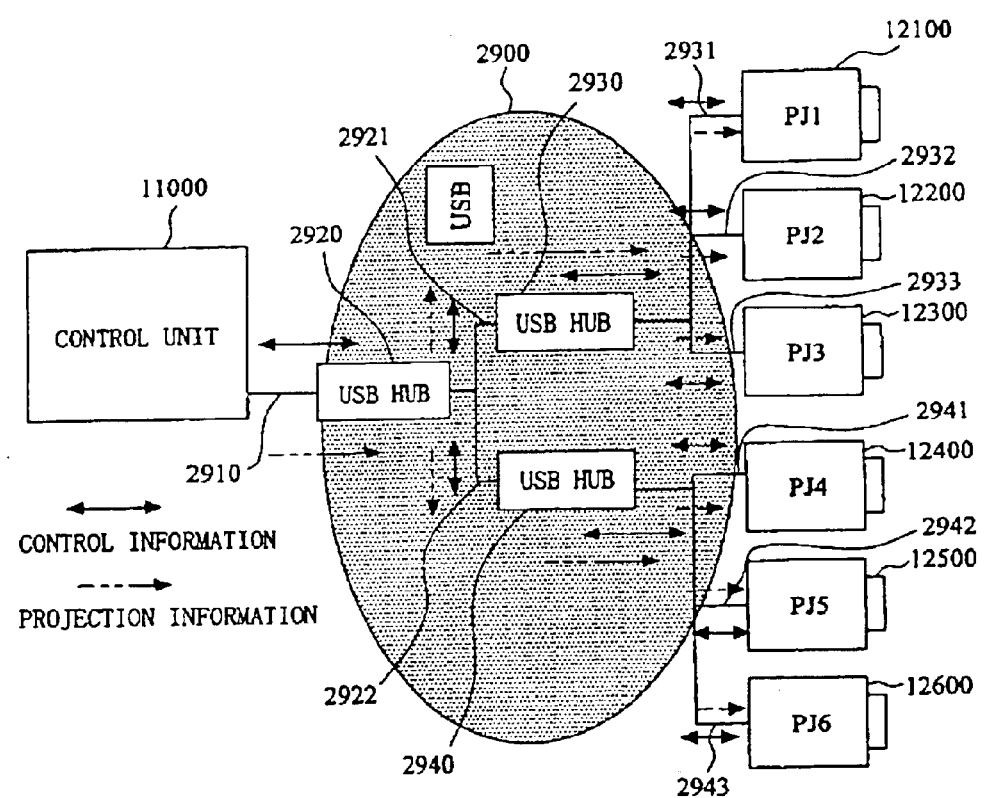
FIG. 2 is a block diagram illustrating a connection configuration (USB connection) of a projector control system according to an embodiment of the present invention.

FIGS. 1 and 2 are block diagrams illustrating a projector control system according to an embodiment of the present invention.

(Network Connection Configuration)

FIG. 1 shows a system in which a control unit 11000 such as a personal computer, etc. and projectors 12100, 12200, 12300, 12400, 12500, and 12600 (hereinafter, a generic name, projector 12000 is sometimes used) are connected to a network (communication line) 1800 with having a network setting individually.

Accordingly, when the control unit 11000 sends projection information (image data and sound data) and control information (information and signal to control a projector), which describes control command for each projector 12000, to the projector through the network 1800, the projector 12000 can receive the projection information and the control information.

Also, when the projector 12000 sends operation information, which describes operation status of the projector 12000, or specific information of the projector 12000 to the control unit 11000 through the network 1800, the control unit 11000 can receive the information.

Specifically, the control information and the projection information issued from the control unit 11000 are shared by the projector 12000, and the projector 12000 can perform a projection operation or another predetermined operation based on the control signal for each of them. For example, in a conference room with many people or in a large exhibition hall, one control unit can project a predetermined image to more than one projector simultaneously. Also when the control unit 11000 communicates with a specific projector among the projector 12000, only the specific projector can perform a projection operation or another predetermined operation.

At the same time, the control unit 11000 can grasp the operation information of each projector 12000, and can control the projector 12000 simultaneously or individually while monitoring them. For example, one control unit obtains operation information (for example, brightness, sound volume, a lamp lighting time, a fan status, a temperature, etc.) of each projector, and can send a predetermined control information (for example, adjustment to cause all the projectors to have the same brightness, adjustment for the projector to produce a sound volume corresponding to the installation site, adjustment to prevent an increase of machine temperature, and the like) corresponding to the operation information.

Accordingly, the operation information, such as a lamp lighting time, a fan status, a temperature, etc. can be analyzed for planning maintenance, and thus wasteful order and inventory of spare parts can be reduced, and projection trouble (a lamp failure during projection, a fan failure) can be prevented.

In this regard, in the figure, a solid line arrow indicates that control reference information (control information, response information, operation information, etc.) is sent in two ways, and the chain double-dashed line indicates that the projection information is send in one direction.

In this regard, the number of the projector 12000 is not limited to six, but any number of projectors may be specified.

Also, the connection to the network 1800 is not limited to wired, but may be connected to the network 1800 wirelessly by installing a sending/receiving module in the control unit 11000 or one or more projector among the projector 12000.

Figure 3:
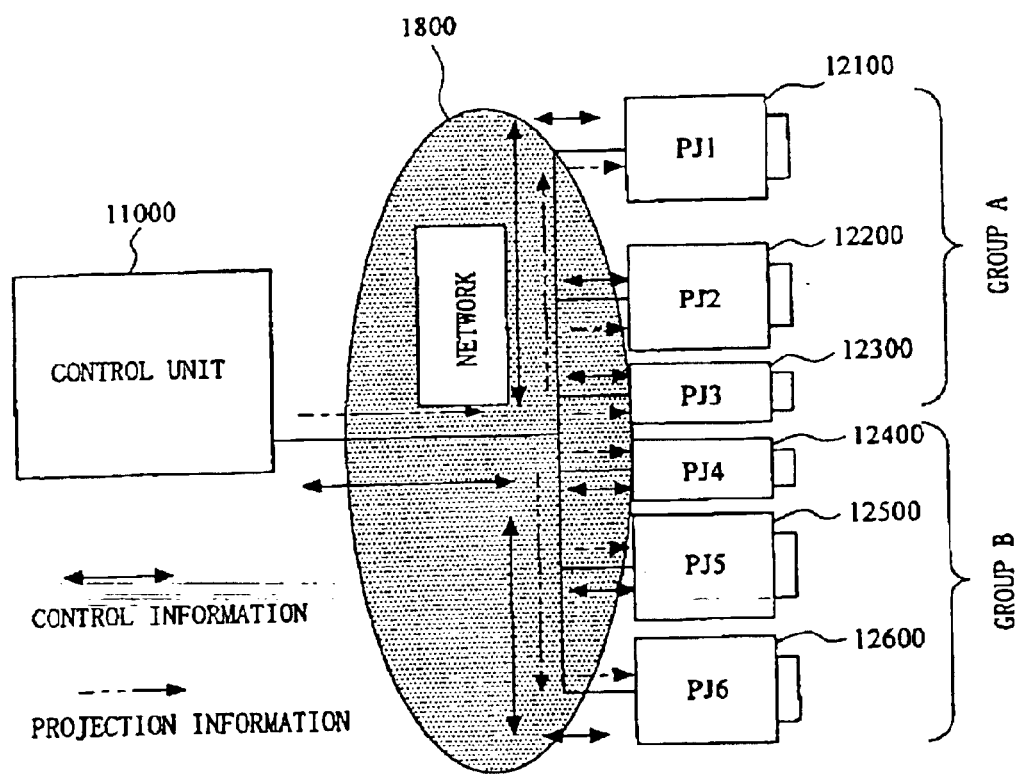
FIG. 3 is a block diagram illustrating a connection configuration (network connection) of a projector control system according to an embodiment of the present invention, and the projectors are divided into two groups A and B.

Furthermore, if the control unit 11000 has a function of registering and managing the projector 12000 in each group, as shown in FIG. 3, each of the projector 12000 can be controlled by group. Accordingly, for example, by grouping for each grade at a school or by grouping for each show window at a shop, and by controlling the projectors for each group, projection can be performed with different projection content and different projection condition for each group.

(USB Connection Configuration)

FIG. 2 shows a system in which a control unit 11000 such as a personal computer, etc. and projectors 12100, 12200,

12300, 12400, 12500, and 12600.(hereinafter, a generic name, projector 12000 is sometimes used) are connected through a USB(Universal Serial Bus) hub individually, and the communication line 2900 is formed by a wired line in a tree structure.

Specifically, a wiring line 2910 branches into a wiring line 2911 and a wiring line 2912 by a USB hub 2920. Further, the wiring line 2911 branches into wiring lines 2931, 2932, and 2933 by a USB hub 2930, the projector 12100 is connected to the wiring line 2931, the projector 12200 is connected to the wiring line 2932, and the projector 12300 is connected to the wiring line 2933. Also, the wiring line 2922 branches into wiring lines 2941, 2942, and 2943 by a USB hub 2940, the projector 12400 is connected to the wiring line 2941, the projector 12500 is connected to the wiring line 2942, and the projector 12600 is connected to the wiring line 2943.

Accordingly, in the same manner as described in the case of a network connection structure, the control information and the projection information issued from the control unit 11000 are shared by the projector 12000, and the projector 12000 can perform a projection operation or another predetermined operation based on the control signal for each of them. At the same time, the control unit 11000 can grasp the operation information of each projector 12000, and can control the projector 12000 simultaneously or individually while monitoring them. Also, when the control unit 11000 communicates with a specific projector among the projector 12000, only the specific projector can perform a projection operation or another predetermined operation. Furthermore, in this structure, the communication line is formed through USB hubs, thus network construction is not necessary, and addition of a projector, etc. like can performed easily.

In this regard, in the figure, a solid line arrow indicates that control reference information (control information, response information, operation information, etc.) is sent in two ways and the chain double-dashed line indicates that the projection information is send in one direction.

Also, the number of the projector 12000 is not limited to six, but any number of projectors may be specified. Also, the number of hierarchies of disposing USB hubs is not limited to two hierarchies, but can be specified for arbitrary number of hierarchies. Also, the number of branches for each USB hub can be set arbitrary within the number of terminals contained in the hub.

Figure 4:
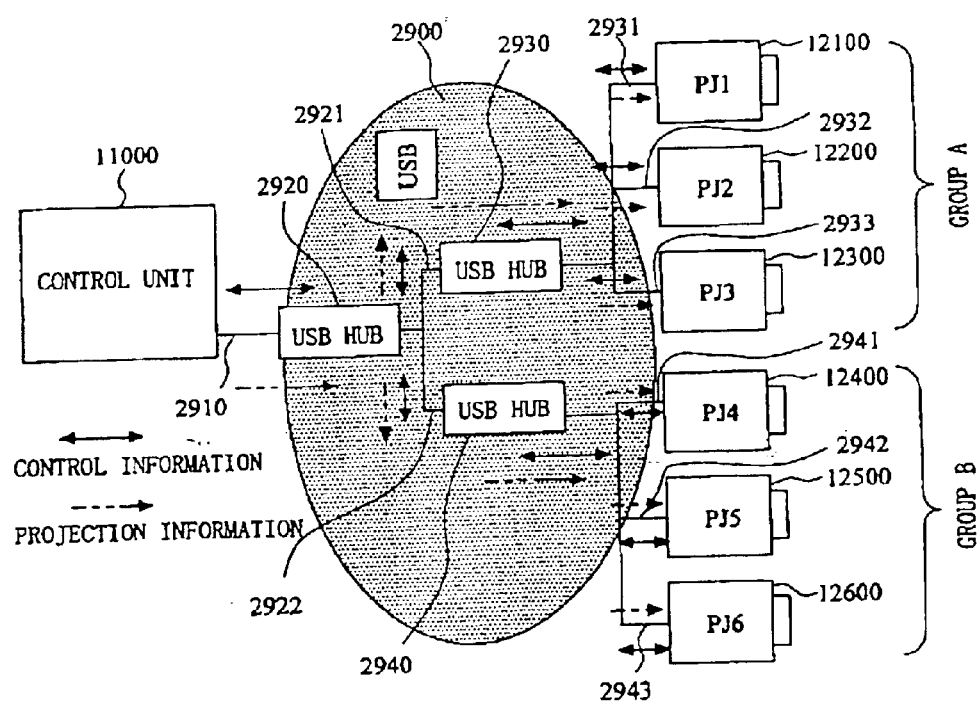
FIG. 4 is a block diagram illustrating a connection configuration (USB connection) of a projector control system according to an embodiment of the present invention, and the projectors are divided into two groups A and B.

Furthermore, if the control unit 11000 has a function of registering and managing the projector 12000 in each group, as shown in FIG. 4, each of the projector 12000 can be controlled by group. Accordingly, for example, by grouping for each grade at a school or by grouping for each show window at a shop, and by controlling the projectors for each group, projection can be performed with different projection content and different projection condition for each group.

[Configuration of Control Unit and Projector]

(Configuration of Control Unit)

Figure 5A:
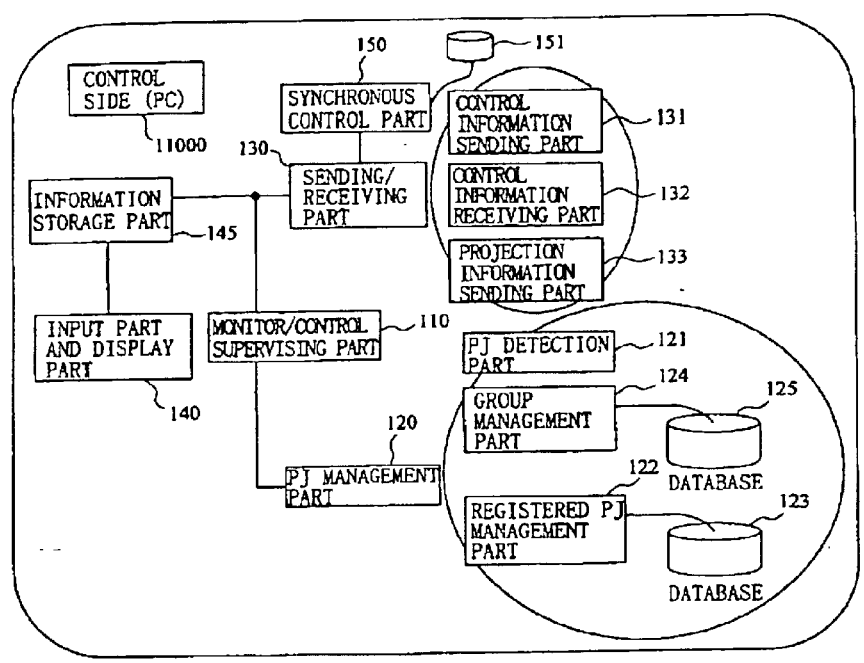
FIG. 5A is a block diagram illustrating the configuration of the control unit of a projector control system according to an embodiment of the present invention.
Figure 5B:
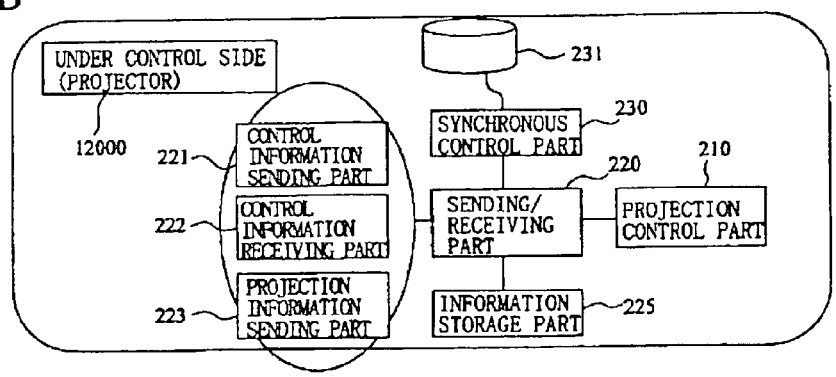
FIG. 5B is a block diagram illustrating the configuration of the projector of a projector control system according to an embodiment of the present invention.

FIGS. 5A and 5B are block diagrams illustrating the configuration of a projector control system according to an embodiment of the present invention. FIG. 5A is a block diagram illustrating the configuration of the control unit 11000, and FIG. 5B is a block diagram illustrating the configuration of the projector 12000.

Here, the control unit 11000 includes the following parts (These parts are composed of devices and/or programs):

Sending/receiving part 130 which sends/receives signals and data to/from the projector 12000 connected to the control unit 11000. In this regard, the sending/receiving part 130 includes a control signal sending part 131 which sends control information regarding the projector control to the projector 12000, a control signal receiving part 132 which receives response information (for example, processing result notice, projector operation information and specific information) to the above control signal from the projector 12000, and a projection information sending part 133 which sends projection information to the projector 12000.

Projector management part 120 which registers and manages a projector connected to the control unit 11000. In this regard, the projector management part 120 includes a projector detection part 121 which detects a projector connected to the control unit 11000, a registration projector management part 122 which registers and manages a projector connected to the control unit 11000 in, for example, a database 123, and a group management part 124 which registers and manages the projector connected to the control unit 11000 for each group in, for example, a database 125. In this regard, when the projectors are not registered for each group, the group management part 124 is not needed.

Monitor/control supervising part 110 which sends a control signal for the projector 12000 through the control information sending part 131, at the same time, receives operation information such as the current status of each projector, or specific information, etc. through the control information receiving part 132, and monitors/controls the projector 12000.

Input part and display part 140 which includes input means for inputting projector control information, projection information, or registration information into the control unit 11000 form the outside of the system, and displays input information to the control unit 11000 and the projector result of the control unit 11000, etc.

Information storage part 145 which stores or temporarily holds control information and projection information input from the input part and display part 140. The projection information held here is sent to the projector 12000 through the projection information sending part 133 based on the instructions of the monitor/control supervising part 110.

Synchronous control part 150 which performs synchronization processing among each of the projectors when projecting by a plurality of projectors. The synchronous control part 150 includes a database 151 which manages the processing status of each projector. In this regard, when synchronization processing is not performed, the synchronous control part 150 is not needed.

(Configuration of Projector)

On the other hand, each projector commonly includes the following parts (These parts are composed of devices and/or programs):

Sending/receiving part 220 which sends/receives signals and data to/from the control unit 11000. In this regard, the sending/receiving part 220 includes a control information receiving part 222 which receives control information regarding the projector control from the control unit 11000, a control information sending part 221 which sends response signals for the control signal of the control unit 11000, projector operation information, or projector specific information to the control unit 11000, and a projection information receiving part 223 which receives projection information from the control unit 11000.

Projection control part 210 which controls the operation of the projector 12000 based on the control information sent from the control unit 11000, and analyzes and projects the projection information dent from the control unit 11000. Information storage part 225 which stores or temporarily holds the control information and the projection information sent from the control unit. The projection information held here is supplied for projection at the projection control part 210.

Synchronous control part 230 which synchronizes with the control unit 11000 and among the projectors. The synchronous control part 230 of the projector to become a host projector described later includes a database 231 for managing the processing status of each projector. In this regard, if the synchronization processing is not performed, the synchronous control part 230 is not needed.

[Method of Controlling Projector]

Figure 6A:
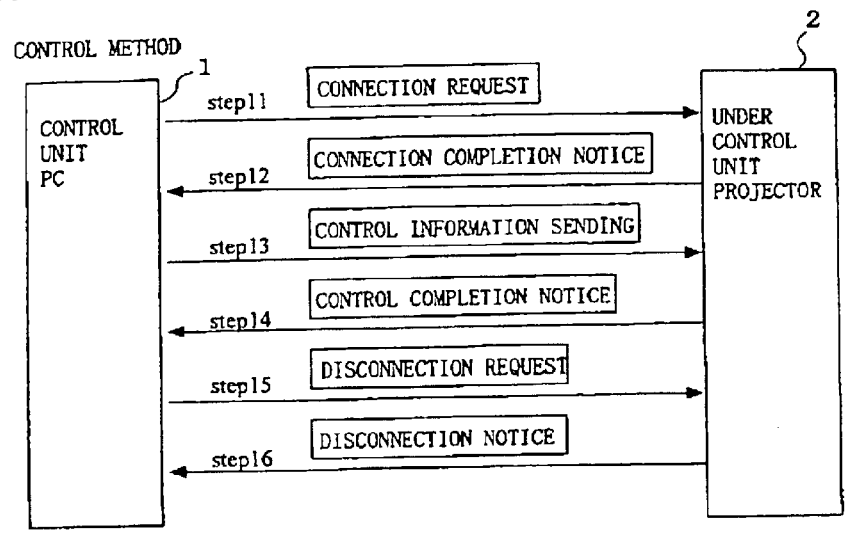
FIG. 6A is a step diagram illustrating the control method of a projector according to an embodiment of the present invention.
Figure 6B:
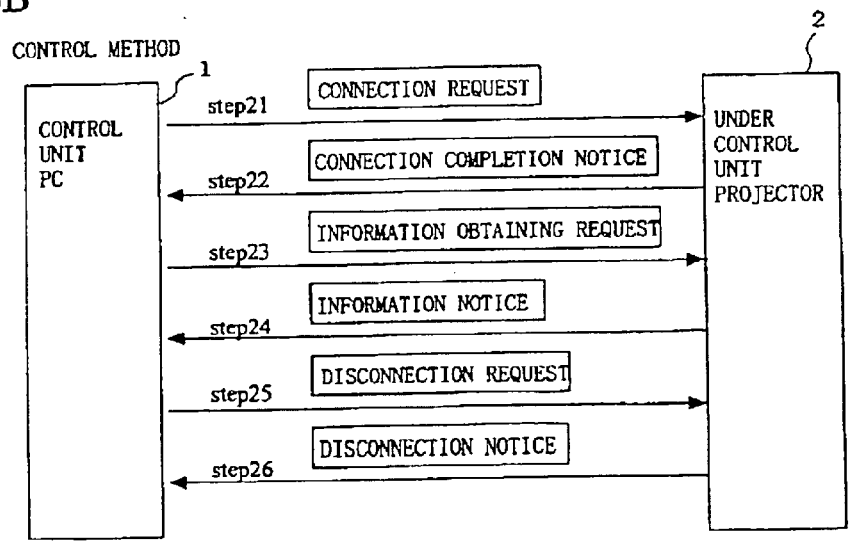
FIG. 6B is a step diagram illustrating the monitoring method of a projector according to an embodiment of the present invention.

Next a description will be given of a method of controlling a projector by the present system which includes the above-described connection configuration and the device configuration. FIG. 6A is a step diagram illustrating the control method of a projector in the present invention, and FIG. 6B is a step diagram illustrating the monitoring method of a projector in the present invention. A description will be given of the projector monitoring/controlling method by the control unit based on these diagrams. In this regard, in the following, for simplification, a control unit is denoted by reference numeral 1, and a projector controlled by the control unit 1 is denoted by reference numeral 2.

(Control Method)

First, the control unit 1 makes a connection request to the projector 2 (all the projectors, any specific projector, or projectors of a specific group) which is to be controlled (step 11). The projector 2, which has received the connection request, establishes a communication enabled state with the control unit 1, and replies its completion notice to the control unit (step 12).

Next, when having received the communication establishment notice, the control unit 1 sends a predetermined control information to the projector 2 (step 13). When having received the information, the projector 2 performs necessary control (processing) in the projection control part 210 based on the control information, and replies the completion notice of the control to the control unit 1 (step 14).

Furthermore, when having received the control completion notice, the control unit 1 makes a disconnection request of a communication capable state to the projector 2 (step 15). When having received this request, the projector 2 disconnects the communication with the control unit 1, and returns the result to the control unit 1 (step 16).

Thus it becomes possible to control a plurality of projectors simultaneously, or to control only a specific projector.

In this regard, the control target of the projector by the control information is not particularly limited. However, the control target is determined in advance, for example, projector simultaneous projection, switching projection information source, turning power ON/OFF, etc.

Also, requests and notices in the figure are performed by the information composed of signals and/or data.

(Monitoring Method)

First, the control unit 1 makes a connection request to the projector 2 (all the projectors, any specific projector, or projectors of a specific group which is under group management) which is to be monitored (step 21). The projector 2, which has received the connection request, establishes a communication enabled state with the control unit 1, and returns its completion notice to the control unit (step 22).

Next, when having received the communication establishment notice, the control unit 1 sends a request for obtaining the information (operation information such as current operation status, specific information for registration) of the projector 2 to the projector 2 (step 23). When having received this request, the projector 2 notices information corresponding to the request to the control unit 1 (step 24).

Furthermore, when having received the target information, the control unit 1 makes a disconnection request of a communication capable state to the projector 2 (step 25). When having received this request, the projector 2 disconnects the communication with the control unit1, and returns the result to the control unit 1 (step 26).

Thus it becomes possible to control a plurality of projectors simultaneously, or to control only a specific projector. In addition, it becomes possible to perform more effective projector control using the monitoring result.

In this regard, information which the control unit 1 can request to obtain from the projector 2 is set arbitrarily in advance. For example, the information may include information on the projector operation status, such as projector's ON/OFF status, brightness, sound volume, a lamp lighting time, a fan status, a temperature, etc., or projector-specific information such as a projector name and an IP address, which are specific to the projector.

Also, requests and notices in the figure are performed by the information composed of signals and/or data.

(Projection Control Method)

Figure 7:
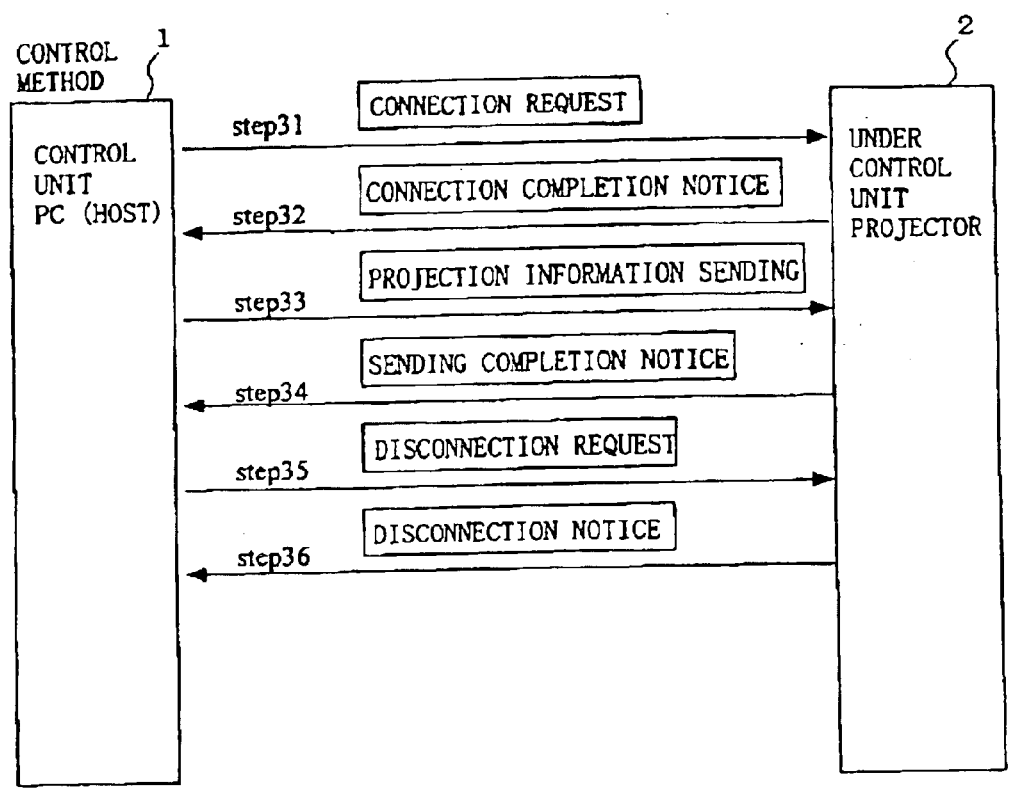
FIG. 7 is a step diagram illustrating the sending method of projection information from the control unit to the projector according to an embodiment of the present invention.

FIG. 7 is a step diagram illustrating the sending method of projection information from the control unit to the projector according to an embodiment of the present invention. A description will be given of the projection control method of the projector based on the figure.

A. Projection Control when the Control Unit Serves as a Host

First, the control unit 1 makes a connection request to the projector 2 (all the projectors, any specific projector, or projectors of a specific group which is under group management) which is to be projected (step 31). The projector 2, which has received the connection request, establishes a communication enabled state with the control unit 1, and returns its completion notice to the control unit (step 32).

Next, when having received the communication establishment notice, the control unit 1 sends projection information including projection data to be projected to the projector 2 (step 33). When having received the projection information, the projector 2 returns a reception completion notice of the information to the control unit 1 (step 34).

Furthermore, when having received the reception completion notice of the information, the control unit 1 makes a disconnection request of a communication capable state to the projector 2 (step 35). When having received this request, the projector 2 disconnects the communication with the control unit 1, and returns the result to the control unit 1 (step 36).

After this, in accordance with the control method shown in FIG. 6A, that is, in response to the projection control information such as projection start of stop from the control unit 1, each projector projects the projection data sent in step 33. In this regard, in this case, when sending the projection information and sending the projection control information are performed successively, those sending may be performed successively without including steps for disconnecting the communication state circuit (steps 35 and 36).

Figure 8:
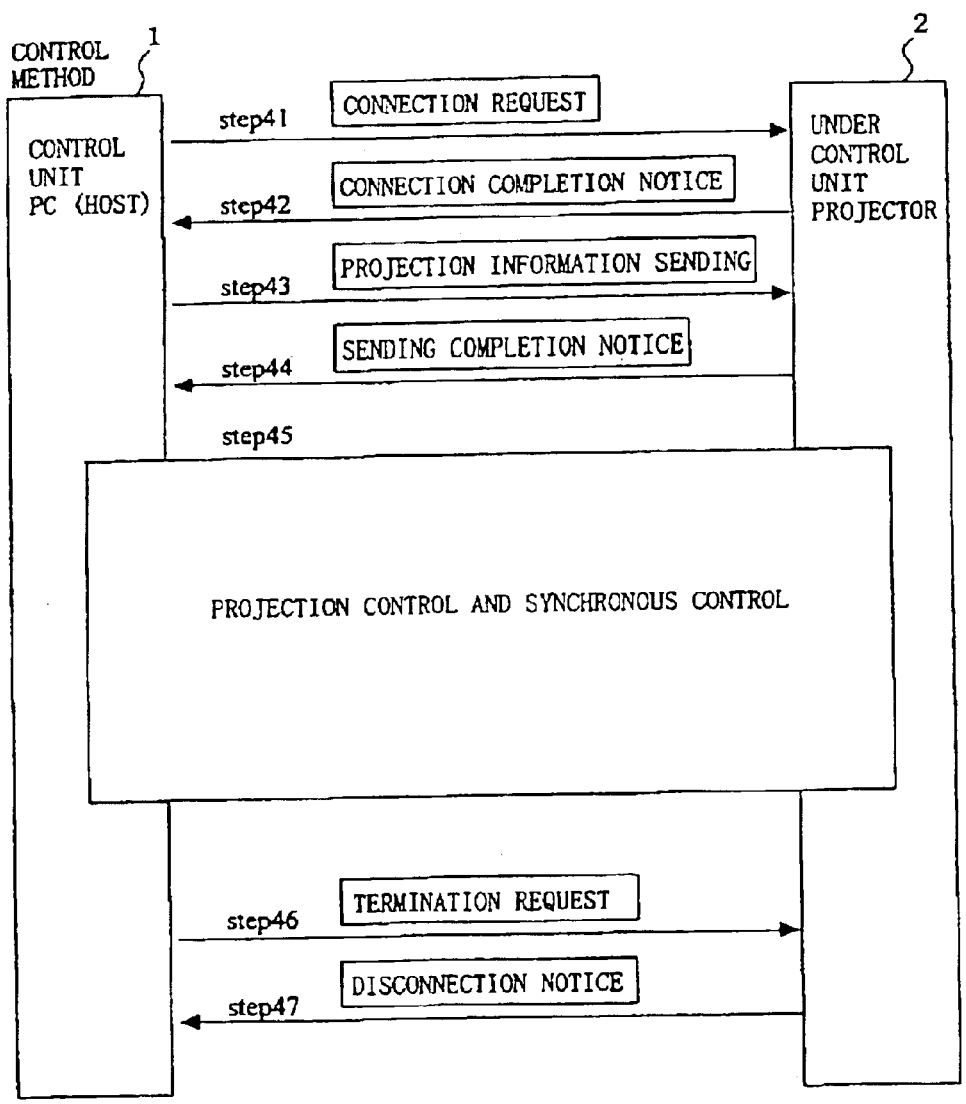
FIG. 8 is a step diagram illustrating method of the projector projection control of the projector having synchronous control step according to an embodiment of the present invention.

Also, when projection is synchronized among each of the projectors, the projection is controlled by the method in the following FIG. 8.

First, the control unit 1 makes a connection request to the projector 2 (all the projectors, any specific projector, or projectors of a specific group which is under group management) which is to be projected (step 41). The projector 2, which has received the connection request, establishes a communication enabled state with the control unit 1, and returns its completion notice to the control unit (step 42).

Next, when having received the communication establishment notice, the control unit 1 sends projection information including projection data to be projected to the projector 2 (step 43). When having received the projection information, the projector 2 returns a reception completion notice of the information to the control unit 1 (step 44).

Next, the control unit 1 sends projection control information to each projector 2 to cause the projector 2 to execute projection. During this time, the control unit 1 performs projection while controlling synchronization by mutually communicating with the projector 2 with respect to a specific projection control information (step 45). In this regard, a description will be given of the synchronous control later.

Finally, the control unit 1 sends projection termination information to the projector 2 (step 46), the projector 2 terminates projection operation when having received this, the projector 2 disconnects communication with the control unit1, and returns the result to the control unit 1 (step 47).

By this method, when performing projection using a plurality of projectors, it becomes possible to eliminate projection time deviation among the projectors.

(Synchronous Control Method)

Figure 9:
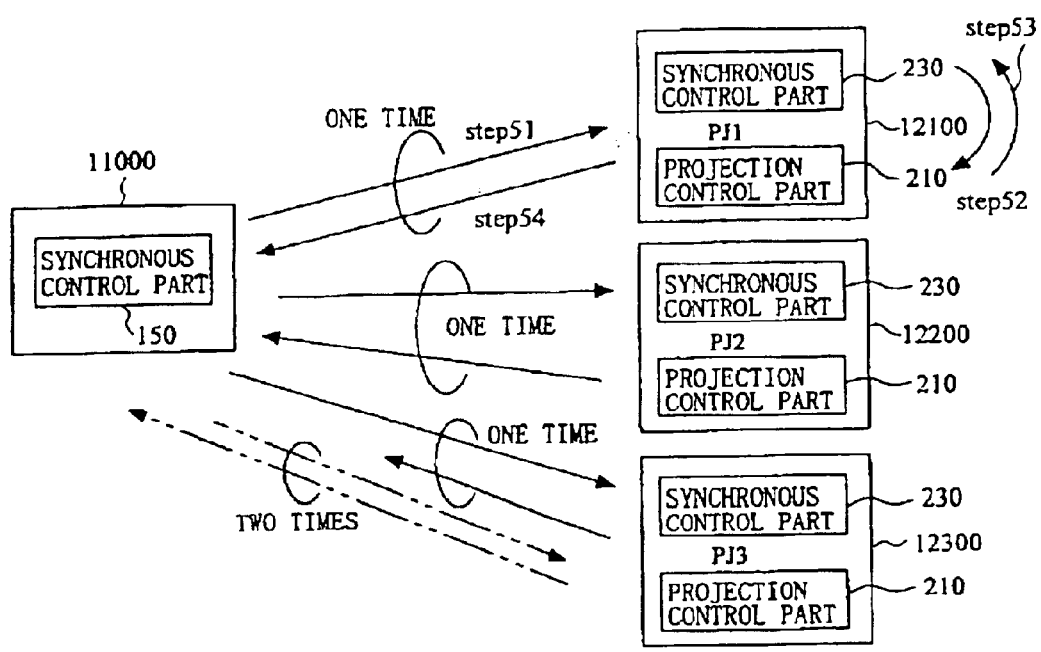
FIG. 9 is a schematic diagram illustrating the synchronous control step according to an embodiment of the present invention.

FIG. 9 is a schematic diagram illustrating the synchronous control among the projectors when performing projection using a plurality of projectors out of the projector control method according to an embodiment of the present invention. A description will be given of an example of the synchronous control method based on the diagram.

First, the control unit 1 adds an ID to a certain projection control information (projection control command), and sends it to the synchronous control part 230 of the projector 2 (step 51).

When the projector 2 receives the projection control information, the synchronous control part 230 deletes the ID form the projection control information, and passes the projection control information to the projection control part 210 (step 52). The projection control part 210 performs processing corresponding to the received control information, adds a status to this (for example, "OK" for processing termination, "NOW" for during processing), and returns to the projector-side synchronous control part 230 (step 53).

The projector synchronous control part 230 adds the above-described ID to the processing status once again, and returns it to the synchronous control part 150 of the control unit 1 (step 54).

The synchronous control part 150 of the control unit 1 performs control in order to eliminate the time deviation of each projector 2 based on time deviation of receiving the "processing termination (OK)". For example, for a projector which goes ahead in projection processing, the projection processing is set to slow, and/or for a projector which lags behind in projection processing, the projection processing is set to fast. Thus the time deviation between the control unit and each projector 2 is corrected. By this means, projection is synchronized among each of the projectors 2, and thus it becomes possible to project the same content onto a plurality of projectors almost at the same time, and to project one large piece of data by combining a plurality of projector.

Also, the above-described processing, steps 51 to 54, is performed a plurality of times in a certain time period, and the projector which cannot be received "processing termination (OK)" status by the synchronous control part 150 of the control unit 1 can be excluded from the target of the simultaneous projection or simultaneous control. In this case, the projection control information to be used for the synchronous control may be only one. Also, by using a plurality of successive projection control information, for all the projection control information, the above-described processing steps 51 to 54 is performed for a plurality of times in a certain time period, and if "processing termination (OK)" status is not received by the synchronous control part 150 of the control unit 1 for all the projection control information in that time, the projector can be excluded form the target of the simultaneous projection and the simultaneous control.

Table 1 is a control table for synchronous control stored in a database 151 by the control unit synchronous control part 150. Taking five projectors (hereinafter, called PJ1, PJ2, PJ3, PJ4, and PJ5.) as an example, deviations of each projector are checked.

In table 1, for the projection control information of which ID is 001, all the statuses are OK (terminated), and thus all the projectors are the target of simultaneous control.

However, for the projection control information of which ID is 002, at the first sending, only PJ1 and PJ5 are OK (terminated), and the statuses are not returned for PJ2, PJ3, and PJ4. Thus the projection control information is sent for these projectors at the second time.

In response to the second time of the projection control information sending, PJ2 is NOW (during processing), PJ3 returns no status, and PJ4 is NOW (during processing). This means that none of them are OK (terminated), and thus projection control information is sent the third time.

In response to the third time of the projection control information sending, PJ2 is OK (terminated), PJ3 returns no status, and PJ4 is NOW (during processing). Here, PJ3, which has no response for three times successively, and PJ4, which has returned NOW (during processing) for second times successively, are excluded from the target of the simultaneous control (or simultaneous projection) at this time. Therefore, at a point in time when the data of which ID is 003 is sent, only PJ1, PJ2, and PJ5 are the target of simultaneous control.

By this synchronous control, projectors which have relatively large time deviation among each of the projectors are excluded from the target of the simultaneous control, and thus a large projection deviation can be protected among projectors on the whole.

TABLE 1

| ID | Times | PJ1 | PJ2 | PJ3 | PJ4 | PJ5 |
|---|---|---|---|---|---|---|
| 001 | 1 | OK | OK | OK | OK | OK |
|  | 2 |  |  |  |  |  |
|  | 3 |  |  |  |  |  |
| 002 | 1 | OK |  |  |  | OK |
|  | 2 |  | NOW |  | NOW |  |
|  | 3 |  | OK |  | NOW |  |
| 003 | 1 | OK | OK |  |  | OK |
|  | 2 |  |  |  |  |  |
|  | 3 |  |  |  |  |  |

B. Projection Control of the Other Projectors by Host Projector

When a plurality of projectors are connected to a network, a specific projector is specified as a host projector in advance, and the projection of the other projectors can be controlled using the host projector. Also, in a system which is under group management, a specific projector for each group is specified as a host projector, and the projection of the other projectors in the same group can be controlled using the host projector. In this case, the information sending/receiving parts 221 and 222 of the projector 12000 which becomes the host projector sends/receives the control information to/from the other projectors 12000 in addition to sending/receiving the control information to/from the control unit 1.

Figure 10:
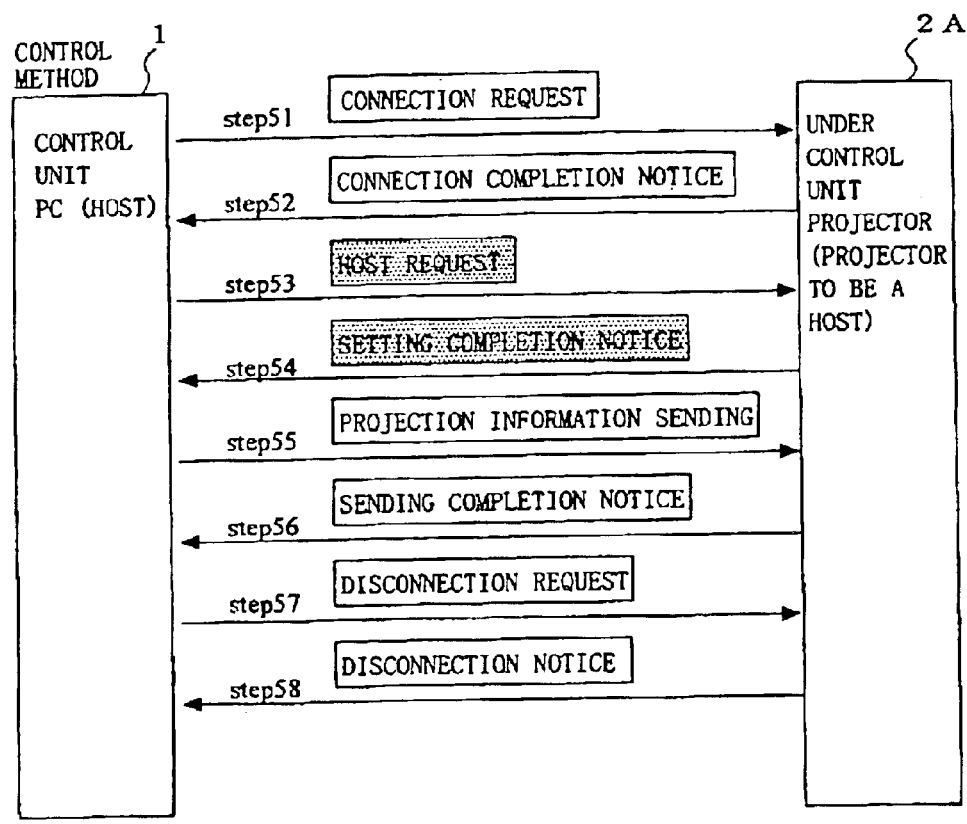
FIG. 10 is a step diagram illustrating control method of the projector according to an embodiment of the present invention when a host function is added to a specific projector.
Figure 11:
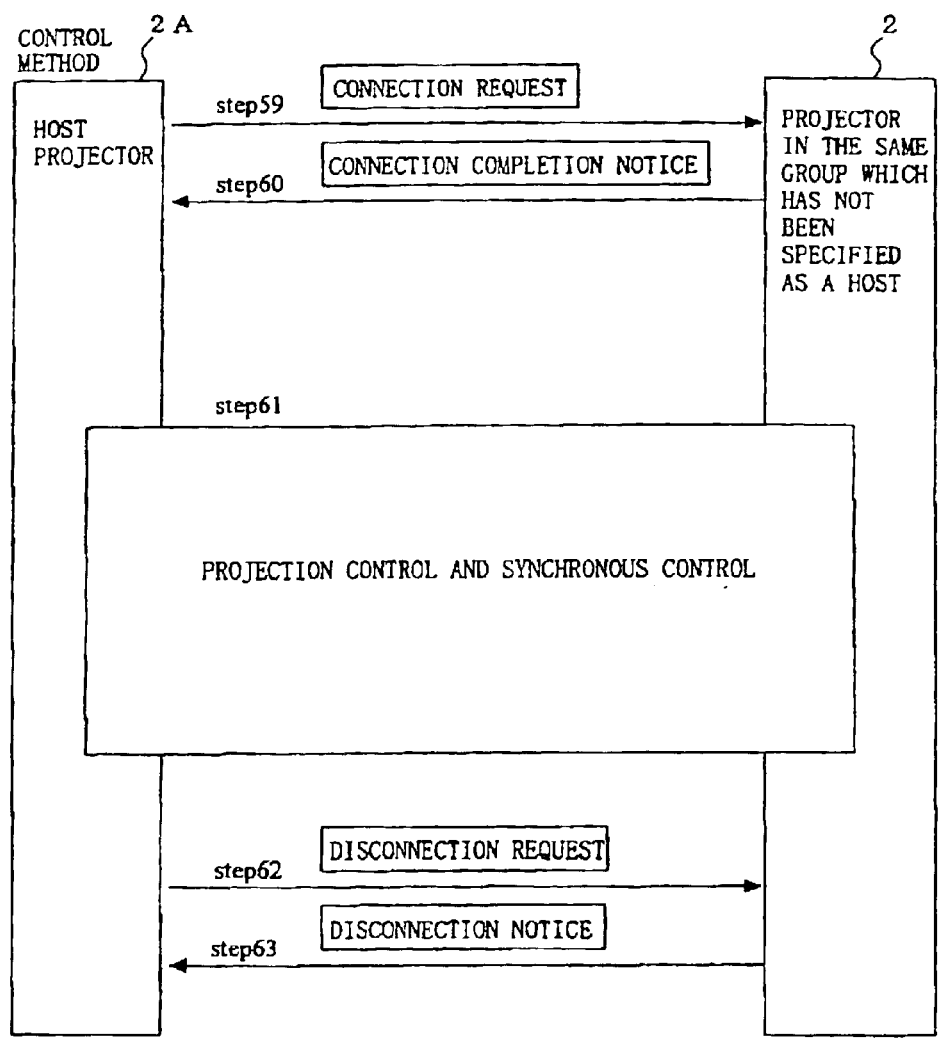
FIG. 11 is a step diagram illustrating the processing control method of the other projector by the host projector.
Figure 12:
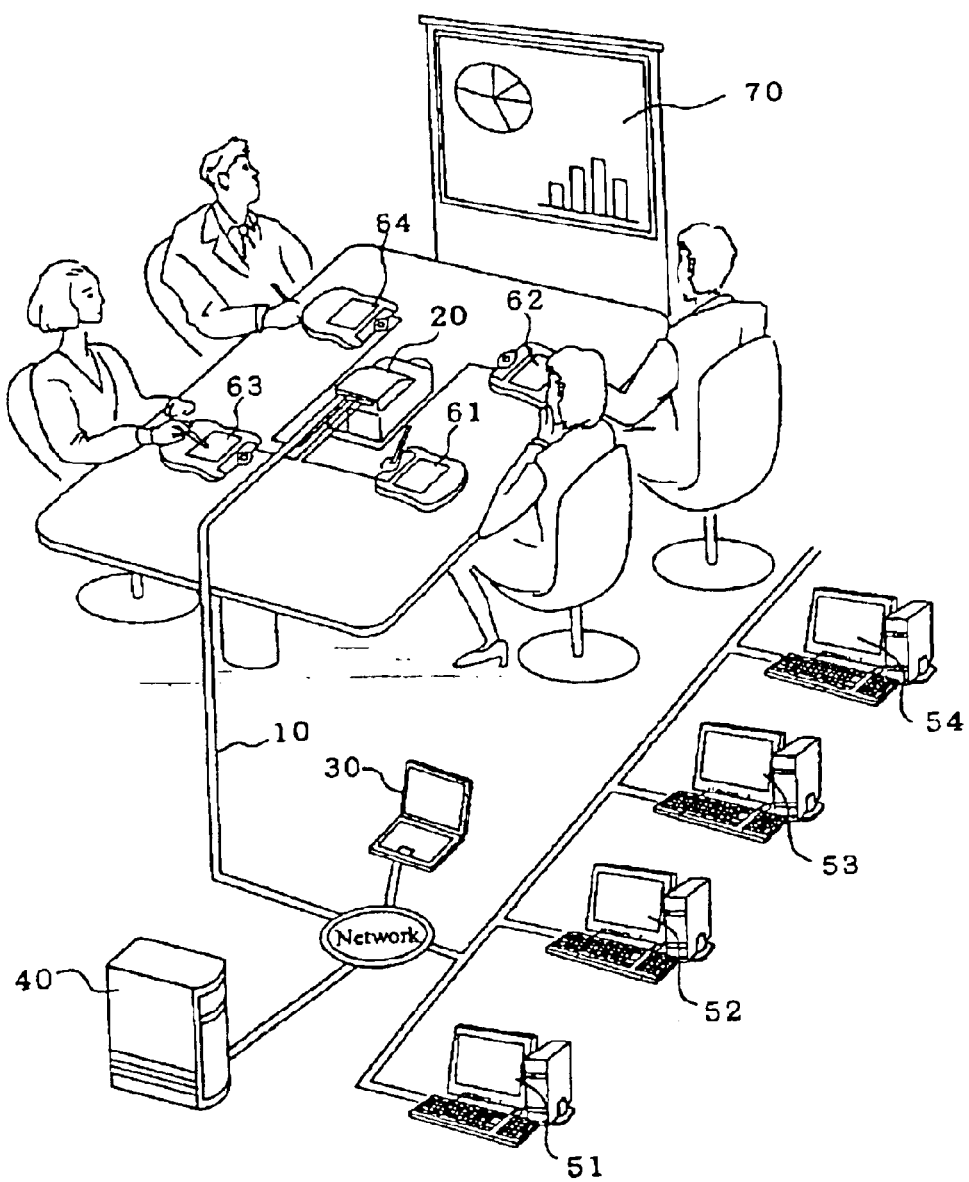
FIG. 12 is a configuration diagram illustrating an example of the conventional projector system connected to a network.

FIG. 10 is a step diagram illustrating control method of the host projector which is constituted by the control unit. FIG. 11 is a step diagram illustrating the control method of the other projector by the host projector. In this regard, in the following a host projector is denoted by reference numeral 2A in order to distinguish it from the other projectors.

First, the control unit 1 makes a connection request to the projector 2A which is to be specified for a host (step 51). The projector 2A, which has received the connection request, establishes a communication enabled state with the control unit 1, and returns its completion notice to the control unit (step 52).

Next, when having received the communication establishment notice, the control unit 1 makes a host request to be projected to the host projector 2A, and sends control information for controlling projection of the other projectors (projection control information and information on the other projectors which constitute the same group as the host projector) to the host projector 2A (step 53). When having received the host request, the host projector 2A returns a setting completion notice based on the information to the control unit 1 (step 54).

Next, the control unit 1 sends projection information including data to be projected to the host projector 2A (step 55). When having received the projection information, the host projector 2A sends the reception completion notice of the information to the control unit 1 (step 56).

When having received the reception completion notice of the projection information from the host projector 2A, the control unit 1 makes a disconnection request of the communication capable state to the host projector 2A (step 57). When having received this, the host projector 2A disconnects communication with the control unit 1, and sends the result to the control unit 1 (step 58).

In this regard, the communication between the control unit 1 and the projectors 2 other than the host projector is shown by the same steps in FIG. 10 with the exception that the steps 53 and 54 are excluded. The control unit 1 sends projection information including the projection data to each projector 2 other than the host projector.

Next, the host projector 2A makes a connection request to the other projectors 2 in the same group (all the projectors or any specific projector) (step 59). The projector 2, which has received the connection request, establishes a communication enabled state with the host projector 2A, and returns its completion notice to the host projector 2A (step 60).

Next, the host projector 2A sends projection control information to each projector 2 to execute projection. During this time, if needed, the synchronous control processing is executed additionally between the synchronous control part 230 of the projector 2A and the synchronous control part 230 of the other projectors 2 (step 61). In this regard, this synchronous control processing can be executed in the same manner as the above-described synchronous control processing between the control unit 1 and the projectors 2.

Finally, the host projector 2A sends projection termination information to the projector 2 (step 62), the projector 2 terminates projection operation when having received this, the projector 2 disconnects communication between them, and returns the disconnection notice to the host projector 2A (step 63).

In such a manner, by specifying a host projector by the control unit, and causing the host projector to take charge of the projection control of the other projectors, the load of the control unit can be reduced, and the control unit can perform the other operation during this time period. Also, while the other projectors are under the control of the host projector, there is no impact even if the control unit is stopped (turning the power off, suspending a connection to a network).

By the projection control using such a host projector, the host projector can obtain, for example, operation information (for example, brightness, sound volume, a lamp lighting time, a fan status, a temperature, etc.) of each projector, and send the obtained operation information all together to the control unit as relevant group information.

Also, if a predetermined control function is added to the host projector, it becomes possible to issue a control signal without depending on the control unit (even if the power of the control unit is off).

[Projector Registration Management]

In the following, a description will be given of the other functions, etc. in an embodiment of the present invention.

(Registration of Projector)

The projector management part 120 of the control unit 11000 registers each projector connected to the control unit 11000 using basically a projector name, a connection type, and a projector identification code.

The projector name is a specific name of the projector, and conforms to personal computer names.

The connection type is a method by which the control unit and the projector are connected, and is a type such as USB, network (for example, LAN, Bluetooth (Bluetooth SIG Inc., a registered trademark in the U.S.A.) which is a wireless LAN in a short distance), etc.

The projector identification code is an IP address (Note that in the case of the projector registered by the following detection method, it is 0) in a network, a serial communication port number in USB, or a specific ID, etc.

(Projector Registration Method)

For registration method of the projector, there are a manual method and a detection method. The manual method can be used for a projector connected to a network, and is a method in which a projector name and an IP address is entered and registered from the input part and display part 140 for each projector. On the other hand, the detection method can be applied to a projector connected by USB and Bluetooth in addition to a network. In the detection method, a newly connected projector 12000 to the control unit 11000 is automatically detected by the projector detection part 121 of the control unit 11000, and the result is registered.

In this regard, a projector connected to a network is preferably registered by only a projector name. When the control unit is connected to a projector, the control unit sends a broadcast (simultaneous transmission to all projectors), and causes each projector to return a projector name and an IP address to obtain them. Then the control unit compares the registered projector name with the obtained set of the projector name and IP address in order to identify the target projector. By doing this, for example, when each projector is supplied with an IP address by DHCP (Dynamic Host configuration Protocol) connected to the network, and the IP address may be changed, it is possible to prevent a failure to identify the projector.

Also, for registering a projector when each projector is connected by USB, for example, for each projector connected to a COM port, a projector name is inquired, and then the returned projector name is registered.

Furthermore, when connected by Bluetooth, a projector name is obtained and registered from the detected projector.

Incidentally, in the above description, the control unit is described as a PC (personal computer), however, the control unit is not limited to this, and may be the other general-purpose computer or a dedicated control unit, etc.

As described above, by the present invention, one control unit and one or more projector are connected to a communication line in a mutually communication capable manner, and control information can be exchanged between the control unit and the projectors, thus it becomes possible to control a plurality of projectors simultaneously or individually by one control unit in order to project desired data onto desired projectors. Also, the control unit is constructed to allow to obtain operation information, etc. of the projectors, and thus it is possible to perform more accurate control on projectors, such as feedback control, device management, planning maintenance, and so on. Furthermore, projectors can be grouped, or a predetermined projector can be functioned as a host projector, and thus the projectors can be managed more efficiently.

What is claimed is:

1. A projector control system comprising:
   one or more projectors;
   a control unit for controlling the projector; and
   a communication line for connecting the projector and the control unit by two-way communications,
   wherein the control unit includes:
   a control information sending/receiving part which sends/receives control information to/from the projector;
   a projector management part which registers and manages a projector connected to the communication line; and
   a monitoring/control supervising part which sends control information to the projector through the control information sending/receiving part, receives operation information of the projector through the control information sending/receiving part, and monitors/controls the projector.

2. A projector control system according to claim 1, wherein the operation information includes information about projector's ON/OFF status, brightness, sound volume, a lamp lighting time, a fan status or a temperature.

3. A projector control system according to claim 2, wherein the control unit includes:
   a projection information storage part for holding projection information; and
   a projection information sending part for sending projection information to the projector.

4. A projector control system according to claim 2, wherein the projector includes:
   a control information sending/receiving part which sends/receives control information to/from the control unit; and
   a projection control part which controls the projector based on the control information from the control unit.

5. A projector control system according to claim 3, wherein the projector includes:
   a control information sending/receiving part which sends/receives control information to/from the control unit;
   a projection information receiving part which receives projection information from the control unit; and
   a projection control part which is controlled based on the control information from the control unit, and analyzes and projects projection information from the control unit.

6. A projector control system according to claim 1, further comprising synchronous control means by which the control unit and each of the projectors are synchronized with respect to projection.

7. A projector control system according to claim 1, wherein the control unit includes a group management part which registers and manages the projectors in groups.

8. A projector control system according to claim 1, wherein the control unit and each projector are connected to a network.

9. A projector control system according to claim 1, wherein the control unit and each projector are connected via a USB connection.

10. A projector control system according to claim 1, wherein the control unit includes an information input part which inputs information into the control unit.

11. A projector control system according to claim 1, wherein the control unit includes projector detection means which detects a projector connected to the communication line.

12. A method of controlling a projector, in which a system comprising a control unit connected to one or more projectors through a communication line is used, the method comprising:
   a step for making a state capable of communication between the control unit and the projector;
   a step for sending control information of the projector from the control unit to the projector; and
   a step for disconnecting the state capable of communication between the control unit and the projector, wherein the method further comprises:
   obtaining step of operation information of the projector by the control unit from the projector which is in a communication enabled state.

13. A method of controlling a projector according to claim 12, wherein the operation information includes information about projector's ON/OFF status, brightness, sound volume, a lamp lighting time, a fan status or a temperature.

14. A method of controlling a projector according to claim 12,
   wherein the control unit sends control information and/or projection information to all the projectors simultaneously.

15. A method of controlling a projector according to claim 12,
   wherein the control unit sends control information and/or projection information to a specific projector among the projectors.

16. A method of controlling a projector according to claim 12, further comprising
   a synchronous control step for synchronizing projections between the control unit and each of the projectors when projecting on more than one projector simultaneously.

17. A method of controlling a projector according to claim 12, further comprising:
   a step for specifying a specific projector as a host projector out of the projectors by the control unit; and
   a step for sending control information and projection information to the other projectors by the specified host projector.

18. A method of controlling a projector according to claim 17,
   wherein synchronous control processing is performed between the host projector and the other projectors.

19. A method of controlling a projector according to claim 12, further comprising:
   a step for registering a projector which is connected to the control unit via a network into the control unit, by entering a projector name and an IP address of each projector from outside of the system.

20. A method of controlling a projector according to claim 19,
   wherein registration of a projector into the control unit is performed using a projector name, a connection method between the control unit and the projector, and a projector identification code.

21. A method of controlling a projector according to claim 12, further comprising:
   a step for registering a projector which is connected to the control unit through a communication line into the control unit, by automatically detecting each projector.

22. A method of controlling a projector according to claim 12, further comprising:
   a step for registering a projector which is connected to the control unit through a network, by a projector name.

23. A method of controlling a projector according to claim 22, further comprising:
   a step for sending control information by broadcast from the control unit to the projectors, a step for returning a projector name and an IP address from each projector to the control unit so that the control unit obtains them, and a step for comparing a registered projector name with the obtained set of the projection name and the IP address to identify the projector.

24. A method of controlling a projector, in which a control unit is connected to one or more projector through a communication line, comprising:
   enabling step to communicate between the control unit and the projector;
   sending step of control information of the projector from the control unit to the projector; synchronous control step which synchronizes between the control unit and each of the projectors with respect to projection when projecting to more than one projectors simultaneously; and
   disconnecting step between the control unit and the projector, wherein
   the synchronous control step includes:
   sending step for sending control information from the control unit to the projector;
   returning step for returning a processing status for the control information by the projector which has received the control information to the control unit; and
   adjusting step for adjusting projection timing of the projector by the control unit based on the processing status of the projector.

25. A method of controlling a projector, in which a control unit is connected to one or more projector through a communication line, comprising:
   enabling step to communicate between the control unit and the projector;
   sending step of control information of the projector from the control unit to the projector; synchronous control step which synchronizes between the control unit and each of the projectors with respect to projection when projecting to more than one projectors simultaneously; and
   disconnecting step between the control unit and the projector, wherein
   the synchronous control step includes:
   sending step for sending control information from the control unit to the projector;
   returning step for returning a processing status for the control information by the projector which has received the control information to the control unit; and
   excluding step for excluding the projector which has not completed the processing for the control information in a predetermined time period by the control unit from the target of an entire projection out of the projectors.

* * * * *